(12) United States Patent
McLaughlin et al.

(10) Patent No.: US 10,469,127 B2
(45) Date of Patent: Nov. 5, 2019

(54) ULTRA-WIDEBAND COMMUNICATION SYSTEM

(71) Applicants: Michael McLaughlin, Dublin (IE); Billy Verso, Maynooth (IE)

(72) Inventors: Michael McLaughlin, Dublin (IE); Billy Verso, Maynooth (IE)

(73) Assignee: Decawave Ltd, Austin, TX (US)

( * ) Notice: Subject to any disclaimer, the term of this patent is extended or adjusted under 35 U.S.C. 154(b) by 0 days.

(21) Appl. No.: 15/316,170

(22) PCT Filed: Jun. 17, 2015

(86) PCT No.: PCT/EP2015/063661
§ 371 (c)(1),
(2) Date: Dec. 4, 2016

(87) PCT Pub. No.: WO2015/193409
PCT Pub. Date: Dec. 23, 2015

(65) Prior Publication Data
US 2018/0145722 A1    May 24, 2018

Related U.S. Application Data

(60) Provisional application No. 62/013,108, filed on Jun. 17, 2014, provisional application No. 62/025,319, filed on Jul. 16, 2014.

(51) Int. Cl.
*H04B 1/719* (2011.01)
*H04B 1/7163* (2011.01)
(Continued)

(52) U.S. Cl.
CPC ......... *H04B 1/719* (2013.01); *H04B 1/7163* (2013.01); *H04J 11/0023* (2013.01);
(Continued)

(58) Field of Classification Search
CPC ........................ H04B 1/7163; H04B 1/719; H04B 2201/694; H04B 2201/71638; H04J 11/00;
(Continued)

(56) References Cited

U.S. PATENT DOCUMENTS

2008/0013602 A1    1/2008  McLaughlin
2008/0279307 A1    11/2008 Gaffney et al.
(Continued)

OTHER PUBLICATIONS

Di Benedetto et al "The Aloha (UWB)2 protocol revisited for IEEE 802.15.4a", 2006, ST Journal of Research, pp. 1-7.*
(Continued)

*Primary Examiner* — Sophia Vlahos
(74) *Attorney, Agent, or Firm* — Artie Pennington; Hunt Pennington Kumar & Dula, PLLC

(57) ABSTRACT

An ultra-wideband communication and/or location system having a plurality of channels, each implementing a respective one of a plurality of predetermined codewords. Within each channel, one or more predetermined pulse repetition frequencies are defined. Within a single UWB system, more than two networks of transceivers may be co-located without mutual interference if each is assigned a unique combination of codewords and spreading factors.

3 Claims, 2 Drawing Sheets

(51) Int. Cl.
  *H04J 11/00* (2006.01)
  *H04L 5/02* (2006.01)
(52) U.S. Cl.
  CPC ........ *H04L 5/026* (2013.01); *H04B 2201/694* (2013.01); *H04B 2201/71638* (2013.01); *H04J 2211/001* (2013.01)
(58) Field of Classification Search
  CPC .. H04J 11/0023; H04J 2211/001; H04L 5/026
  See application file for complete search history.

(56) References Cited

U.S. PATENT DOCUMENTS

| | | | | |
|---|---|---|---|---|
| 2011/0150044 | A1* | 6/2011 | Rousseaux | H04B 1/71637 375/147 |
| 2013/0136119 | A1* | 5/2013 | Hund | H04B 1/7183 370/350 |
| 2014/0219317 | A1* | 8/2014 | Jeong | H04B 1/707 375/130 |

OTHER PUBLICATIONS

IEEE, "IEEE Std. 802.15.4a-2007", 2007, pp. 1-203.
T. Hoholdt et al., "Ternary sequences with perfect periodic autocorrelation", IEEE Trans. Information Theory, Jul. 1, 1983, pp. 597-600.
Samuel T. Blake et al., "A Construction for Perfect Periodic Autocorrelation Sequences", "Lecture Notes in Computer Science", Springer, Berlin, Dec. 3, 2012, pp. 104-108.

\* cited by examiner

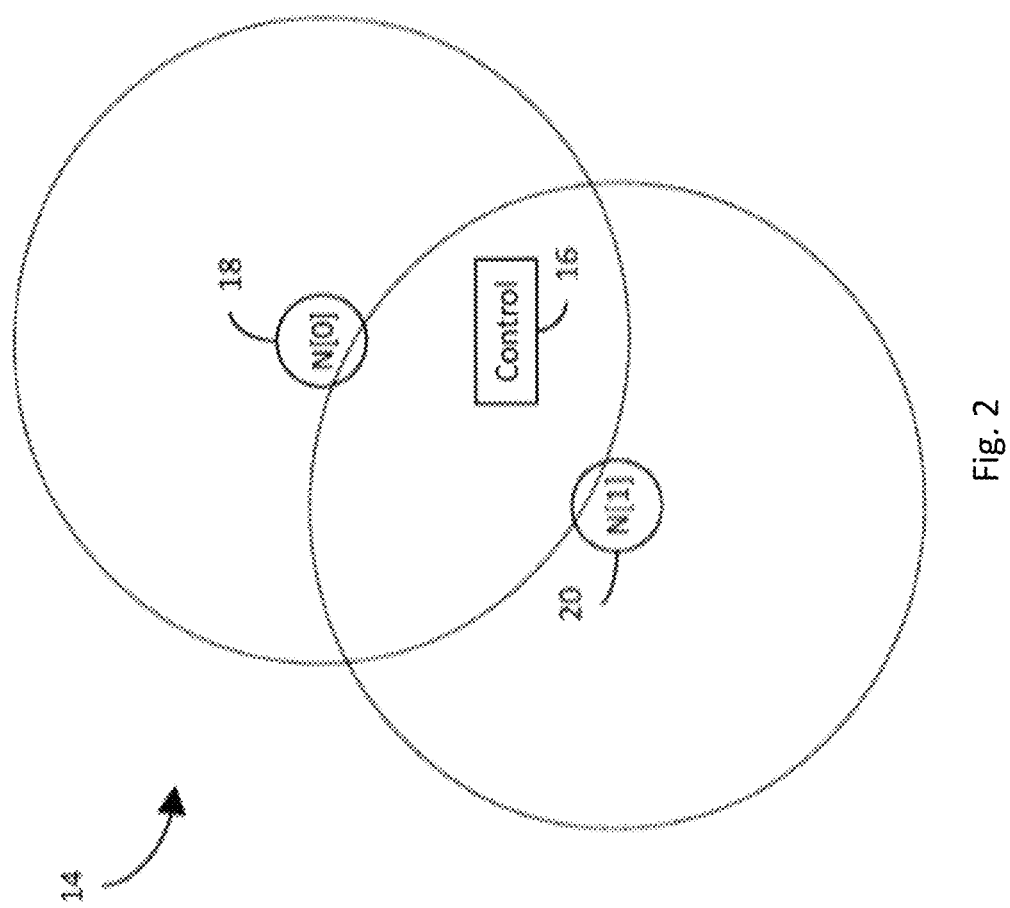

ULTRA-WIDEBAND COMMUNICATION SYSTEM

CROSS-REFERENCE TO RELATED APPLICATIONS

This application is related to both Provisional Application Ser. No. 62/013,108, filed 17 Jun. 2014 ("First Provisional Application"), and Provisional Application Ser. No. 62/025,319, filed 16 Jul. 2014 ("Second Provisional Application"), and is a national stage entry of PCT Application Serial No. PCT/EP2015/063661 ("PCT Application"). This application claims priority to:
1. The First Provisional Application;
2. The Second Provisional Application; and
3. The PCT Application; and hereby claims benefit of the filing dates thereof pursuant to 37 CFR § 1.78(a)(4).

The subject matter of this Application is also related to the subject matter of U.S. Pat. No. 7,787,544, issued 31 Aug. 2010 ("Related Patent").

The subject matter of the First and Second Provisional Applications, and the Related Application (collectively, "Related References"), each in its entirety, is expressly incorporated herein by reference.

BACKGROUND OF THE INVENTION

1. Field of the Invention

The present invention relates to a ultra-wideband ("UWB") communication system having increased channel capacity.

2. Description of the Related Art

In general, in the descriptions that follow, we will italicize the first occurrence of each special term of art that should be familiar to those skilled in the art of integrated circuits ("ICs") and systems. In addition, when we first introduce a term that we believe to be new or that we will use in a context that we believe to be new, we will bold the term and provide the definition that we intend to apply to that term. In addition, throughout this description, we will sometimes use the terms assert and negate when referring to the rendering of a signal, signal flag, status bit, or similar apparatus into its logically true or logically false state, respectively, and the term toggle to indicate the logical inversion of a signal from one logical state to the other. Alternatively, we may refer to the mutually exclusive boolean states as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

Hereinafter, when we refer to a facility we mean a circuit or an associated set of circuits adapted to perform a particular function regardless of the physical layout of an embodiment thereof. Thus, the electronic elements comprising a given facility may be instantiated in the form of a hard macro adapted to be placed as a physically contiguous module, or in the form of a soft macro the elements of which may be distributed in any appropriate way that meets speed path requirements. In general, electronic systems comprise many different types of facilities, each adapted to perform specific functions in accordance with the intended capabilities of each system. Depending on the intended system application, the several facilities comprising the hardware platform may be integrated onto a single IC, or distributed across multiple ICs. Depending on cost and other known considerations, the electronic components, including the facility-instantiating IC(s), may be embodied in one or more single- or multi-chip packages. However, unless we expressly state to the contrary, we consider the form of instantiation of any facility that practices our invention as being purely a matter of design choice.

In the Related Patent, I. Michael McLaughlin, disclosed a method and apparatus for designing a set of ternary codewords which have good properties for use in communication systems, especially, in UWB communication systems. As I noted:

"A family of ternary sequences with perfect periodic autocorrelation was discovered by Valery Ipatov ("Ternary sequences with ideal autocorrelation properties", Radio Eng. Electron. Phys., vol. 24, pp. 75-79, October 1979) and extended by T. Hoholdt, et al. ("Ternary sequences with Perfect Periodic Autocorrelation", IEEE Transactions on Information Theory, vol. 29, no. 4, pp. 597-600, May 1983) ("Hoholdt, et al."). There are many sequences in this family, for example, lengths 7, 13, 21, 31, 57, 63, 73, 91, 127, 133, 183, 273, 307, 381, 511, 553, 651, 757, 871, 993, 1057, 1407, 1723."

In the Related Patent, I disclosed two particular codewords, the first of length 31 and the second of length 127, that I designed using my method, which codewords have since been adopted as mandatory in the IEEE 802.15.4 standard for wireless personal area networks ("WPAN"). I and my co-inventor, Billy Verso, deem this limitation to be unnecessary, and, therefore, unacceptable. Accordingly, we submit that a pressing need exists for a method and apparatus for increasing both the number of independent UWB channels and the capacity.

BRIEF SUMMARY OF THE INVENTION

In one aspect of our invention, we provide a method in an ultra-wideband ("UWB") communication and/or location system comprising co-located first and second UWB transceiver networks, the method comprising the steps of:
[1] selecting a first and a second unique pCode, each pCode comprising a combination of:
  a selected one of a plurality of predefined modulation codes; and
  a selected one of a plurality of spreading factors,
  wherein the combination results in a unique symbol length
[2] assigning to each of said first and second transceiver networks, respectively, the first and second pCodes; and
[3] simultaneously operating each of said first and second transceiver networks, respectively, using the first and second pCodes.

Each of the unique symbol lengths may be developed as a function of a selected one of the predefined modulation codes and a selected one of a plurality of predefined spreading factors.

The method may further comprise the step of:
[4] simultaneously switching each of the transceivers to a different one of the pCodes in accordance with a precoordinated pSchedule.

In a second aspect, the invention provides a method in an ultra-wideband ("UWB") communication system comprising at least two co-located UWB networks of transceivers, the method comprising the steps of:
  [1] selecting at least two unique pCodes, each pCode comprising a combination of:
    a selected one of a plurality of predefined modulation codes; and
    a selected one of a plurality of predefined spreading factors;
    wherein the combination results in a unique symbol length;
  [2] assigning to each of said at least two networks of transceivers, respectively, a unique pCode; and
  [3] simultaneously operating each of said at least two networks of transceivers, respectively, using the assigned unique pCodes,
  wherein each of the unique pCodes is selected from a plurality of at least 15 different pCodes.

Preferably, each of the unique pCodes is selected from a plurality of at least 49 different pCodes.

According to a third aspect, the invention provides a method in an ultra-wideband ("UWB") communication system, the method comprising the steps of:
  determining at least two unique preamble symbols, each unique preamble symbol having a different length and comprising a unique combination of one of a plurality of different modulation codes and one of a plurality of different spreading factors;
  assigning each unique preamble symbol to a different UWB channel in the UWB system, wherein each different preamble symbol provides an independent co-located channel in the UWB system.

In a further aspect, the invention provides a UWB communication system configured to perform the method as described above. In another aspect, the invention provides a computer readable medium including executable instructions which, when executed in a processing system, causes the processing system to perform the steps of a method as described above.

BRIEF DESCRIPTION OF THE SEVERAL VIEWS OF THE DRAWINGS

Our invention may be more fully understood by a description of certain preferred embodiments in conjunction with the attached drawings in which:

FIG. 2 illustrates, in topographic form, an UWB communication system adapted to practice our invention.

Figure 1:
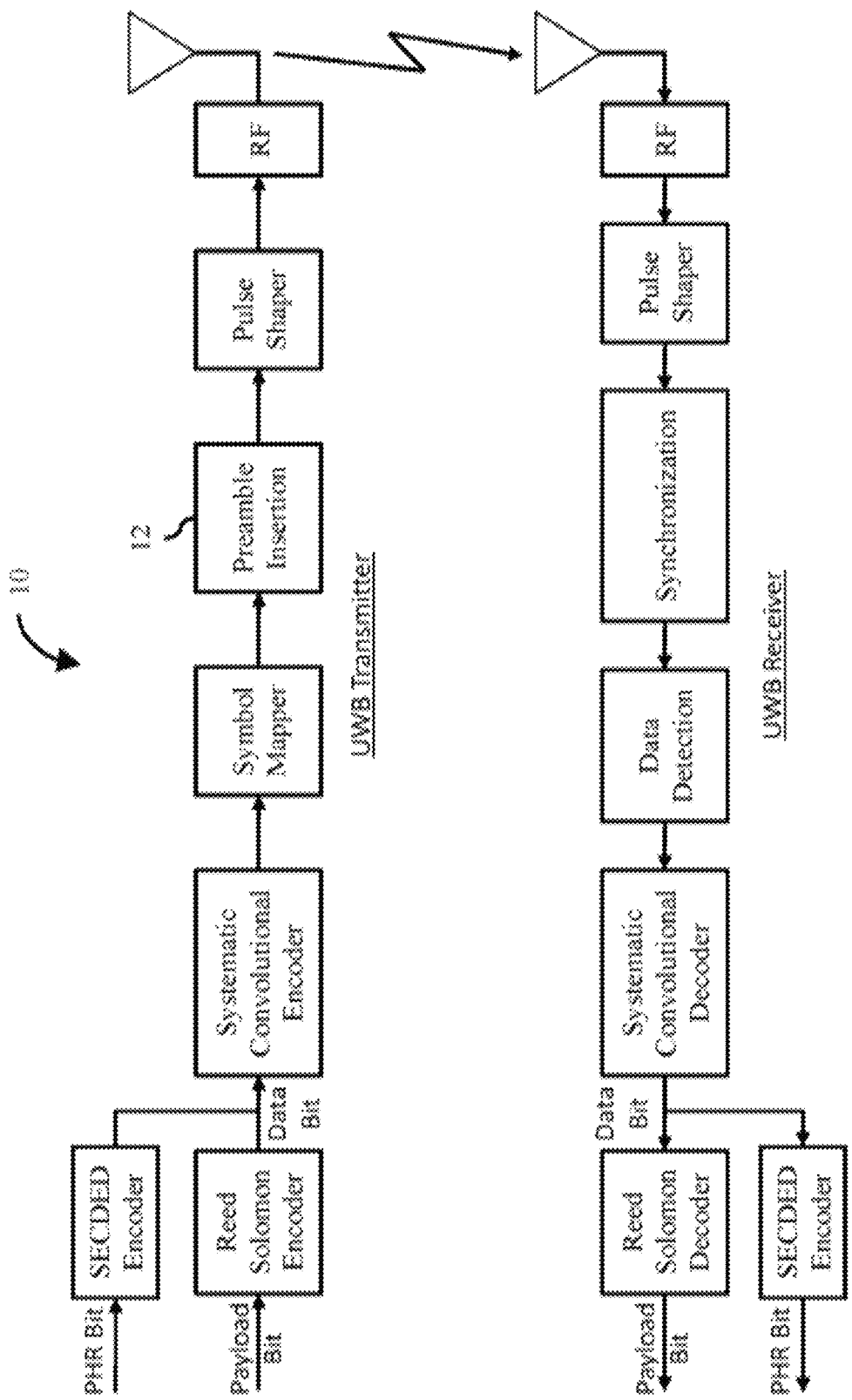
FIG. 1 illustrates, in block diagram form, an UWB communication transceiver adapted to practice our invention.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

Shown in FIG. 1 is a UWB transceiver 10 substantially as presented in FIG. 27a, "PHY signal flow", on page 63 of the IEEE 80215.4a-2007, the entirety of which is hereby expressly incorporated herein by reference (hereinafter "Standard"). In § 6.8a.6.1, "SHR SYNC field", of the Standard, the preamble codes used to identify each PHY channel are enumerated in Table 39d, "Length 31 ternary codes" and Table 39e, "Optional length 127 ternary codes". We note that both of these sets of codes were designed using the method disclosed in the Related Patent. In the UWB transceiver 10, the Preamble Insertion facility 12 actually performs the BPM-BPSK modulation in accordance with the assigned codeword.

In our First Provisional Application, we proposed the following:
  Solution: Assuming we keep the same peak pulse rate of 499.2 MHz, we can add Ipatov sequences to generate more unique symbol lengths. Of course, the pulse amplitude would need to change to maintain the same transmit power. Because all the symbol lengths . . . are different, the signals generated by these codes will not accumulate constructively in a receiver that is correlating with a different code.

We then showed how the number of codewords can be increased from only two in the Standard to the following set of codes:

TABLE 1

New Codes

| Code Index | Sequence Length | # Pulses | Spreading Factor | SymLen (µS) | PRF (MHz) | Relative Amplitude |
|---|---|---|---|---|---|---|
| 1 | 7 | 4 | 71 | 0.996 | 4.02 | 2.00 |
| 2 | 13 | 9 | 38 | 0.990 | 9.09 | 1.33 |
| 3 | 21 | 16 | 24 | 1.010 | 15.85 | 1.01 |
| 4 | 31 | 16 | 16 | 0.994 | 16.10 | 1.00 |
| 5 | 57 | 49 | 9 | 1.028 | 47.68 | 0.58 |
| 6 | 63 | 16 | 8 | 1.010 | 15.85 | 1.01 |
| 7 | 73 | 64 | 7 | 1.024 | 47.68 | 0.58 |
| 8 | 91 | 81 | 5 | 0.911 | 88.87 | 0.43 |
| 9 | 127 | 64 | 4 | 1.018 | 62.89 | 0.51 |
| 10 | 133 | 121 | 4 | 1.066 | 113.54 | 0.38 |
| 11 | 183 | 169 | 3 | 1.100 | 153.67 | 0.32 |
| 12 | 273 | 256 | 2 | 1.094 | 234.06 | 0.26 |
| 13 | 364 | 81 | 1 | 0.729 | 111.09 | 0.38 |
| 14 | 381 | 361 | 1 | 0.763 | 473.00 | 0.18 |
| 15 | 553 | 529 | 1 | 1.108 | 477.53 | 0.18 | wherein:
  the column "Code Index" is added for convenience of reference, both in the following description and in the appended claims;
  the row bearing Code Index of 4, highlighted in gray, represents the existing code of length 31.
  the row bearing Code Index of 9, also highlighted in gray, represents the existing code of length 127; and
  the column "Relative Amplitude" is measured relative to the existing code of length 31.
  Note: In our First Provisional Application, we proposed a second code of length 31, but we now believe this code to be problematic, and no longer advocate its implementation; this codeword has been deleted from the above Table 1.

In our Second Provisional Application, we proposed to use the spreading factor to further increase the number of symbol length options. As we noted:
  As is known, the spreading factor is the number of gaps or zeros that are inserted between pulses. See, e.g., IEEE 802.15.4 (in the UWB PHY). Currently, the spreading factor at a nominal PRF of 64 MHz is 4, which means that in the preamble code of length 127 there are three zeros or gaps in between each pulse in the code. At a nominal PRF of 16 MHz the spreading factor is 16, which means that 15 zeros are inserted between each pulse (or non-pulse) in the code.

We then defined a respective set of unique symbol lengths for each of the 15 codes, as follows:

TABLE 2.1

Index_1 [7::4]

| pCode | PRF | SymLen | Factor | Chips | Amp |
|---|---|---|---|---|---|
| 1 | 5.00 | 0.7993 | 57 | 399 | 1.79 |
| 2 | 4.92 | 0.8133 | 58 | 406 | 1.18 |
| 3 | 4.83 | 0.8273 | 59 | 413 | 1.82 |
|   | 4.75 | 0.8413 | 60 | 420 | 1.84 |
| 4 | 4.68 | 0.8554 | 61 | 427 | 1.86 |
|   | 4.60 | 0.8694 | 62 | 434 | 1.87 |
|   | 4.53 | 0.8834 | 63 | 441 | 1.89 |
| 5 | 4.46 | 0.8974 | 64 | 448 | 1.90 |
|   | 4.93 | 0.9115 | 65 | 455 | 1.92 |
|   | 4.32 | 0.9255 | 66 | 462 | 1.93 |
| 6 | 4.26 | 0.9395 | 67 | 469 | 1.94 |
| 7 | 4.19 | 0.9535 | 68 | 476 | 1.96 |
|   | 4.13 | 0.9675 | 69 | 483 | 1.97 |
| 8 | 4.08 | 0.9816 | 70 | 490 | 1.99 |
| 9 | 4.02 | 0.9956 | 71 | 497 | 2.00 |
|   | 3.96 | 1.0096 | 72 | 504 | 2.02 |
|   | 3.91 | 1.0236 | 73 | 511 | 2.03 |
| 10 | 3.85 | 1.0377 | 74 | 518 | 2.04 |
|   | 3.80 | 1.0517 | 75 | 525 | 2.06 |
|   | 3.75 | 1.0657 | 76 | 532 | 2.07 |
|   | 3.70 | 1.0797 | 77 | 539 | 2.08 |
|   | 3.66 | 1.0938 | 78 | 546 | 2.10 |

TABLE 2.2

Index_2 [13::9]

| pCode | PRF | SymLen | Factor | Chips | Amp |
|---|---|---|---|---|---|
| 11 | 11.52 | 0.7813 | 30 | 390 | 1.18 |
|    | 11.15 | 0.8073 | 31 | 403 | 1.20 |
| 12 | 10.80 | 0.8333 | 32 | 416 | 1.22 |
| 13 | 10.47 | 0.8594 | 33 | 429 | 1.24 |
| 14 | 10.16 | 0.8854 | 34 | 442 | 1.26 |
|    | 9.87 | 0.9115 | 35 | 455 | 1.28 |
| 15 | 9.60 | 0.9375 | 36 | 468 | 1.30 |
| 16 | 9.34 | 0.9635 | 37 | 481 | 1.31 |
| 17 | 9.09 | 0.9896 | 38 | 494 | 1.33 |
| 18 | 8.86 | 1.0156 | 39 | 507 | 1.35 |
| 19 | 8.64 | 1.0417 | 40 | 520 | 1.37 |
| 20 | 8.43 | 1.0677 | 41 | 533 | 1.38 |
|    | 8.23 | 1.9380 | 42 | 546 | 1.40 |

TABLE 2.3

Index_3 [21::16]

| pCode | PRF | SymLen | Factor | Chips | Amp |
|---|---|---|---|---|---|
|    | 20.02 | 0.7993 | 19 | 399 | 0.90 |
| 21 | 19.02 | 0.8413 | 20 | 420 | 0.92 |
|    | 18.11 | 0.8834 | 21 | 441 | 0.94 |
| 22 | 17.29 | 0.9255 | 22 | 462 | 0.97 |
| 23 | 16.54 | 0.9675 | 23 | 483 | 0.99 |
|    | 15.85 | 1.0096 | 24 | 504 | 1.01 |
| 24 | 15.21 | 1.0517 | 25 | 525 | 1.03 |
|    | 14.63 | 1.0938 | 26 | 546 | 1.05 |

TABLE 2.4

Index_4 [31::16]

| pCode | PRF | SymLen | Factor | Chips | Amp |
|---|---|---|---|---|---|
| 25 | 19.82 | 0.8073 | 13 | 403 | 0.90 |
| 26 | 18.40 | 0.8694 | 14 | 434 | 0.94 |
| 27 | 17.18 | 0.9315 | 15 | 465 | 0.97 |
| 28 | 16.10 | 0.9936 | 16 | 496 | 1.00 |
| 29 | 15.16 | 1.0557 | 17 | 527 | 1.03 |
| 30 | 14.31 | 1.1178 | 15 | 558 | 1.06 |

TABLE 2.5

Index_5 [57::49]

| pCode | PRF | SymLen | Factor | Chips | Amp |
|---|---|---|---|---|---|
|    | 61.31 | 0.7993 | 7 | 399 | 0.51 |
| 31 | 53.64 | 0.9135 | 8 | 456 | 0.55 |
| 32 | 47.68 | 1.0276 | 9 | 513 | 0.58 |
| 33 | 42.91 | 1.1418 | 10 | 570 | 0.61 |

TABLE 2.6

Index_6 [63::16]

| pCode | PRF | SymLen | Factor | Chips | Amp |
|---|---|---|---|---|---|
| 34 | 21.13 | 0.7572 | 6 | 378 | 0.87 |
| 35 | 18.11 | 0.8834 | 7 | 441 | 0.94 |
| 36 | 15.85 | 1.0096 | 8 | 504 | 1.01 |
| 37 | 14.09 | 1.1358 | 9 | 567 | 1.07 |

TABLE 2.7

Index_7 [73::64]

| pCode | PRF | SymLen | Factor | Chips | Amp |
|---|---|---|---|---|---|
| 38 | 72.94 | 0.8774 | 6 | 438 | 0.47 |
| 39 | 62.52 | 1.0236 | 7 | 511 | 0.51 |
| 40 | 54.71 | 1.1699 | 8 | 584 | 0.54 |

TABLE 2.8

Index_8 [91::81]

| pCode | PRF | SymLen | Factor | Chips | Amp |
|---|---|---|---|---|---|
| 41 | 111.09 | 0.7292 | 4 | 364 | 0.38 |
| 42 | 88.87 | 0.9115 | 5 | 455 | 0.43 |
| 43 | 74.06 | 1.0938 | 6 | 546 | 0.47 |

TABLE 2.9

Index_9 [127::64]

| pCode | PRF | SymLen | Factor | Chips | Amp |
|---|---|---|---|---|---|
| 44 | 83.86 | 0.7632 | 3 | 381 | 0.44 |
| 45 | 62.89 | 1.0176 | 4 | 508 | 0.51 |

TABLE 2.10

Index_10 [133::121]

| pCode | PRF | SymLen | Factor | Chips | Amp |
|---|---|---|---|---|---|
|  | 151.39 | 0.7993 | 3 | 399 | 0.33 |
| 46 | 113.54 | 1.0657 | 4 | 532 | 0.38 |

TABLE 2.11

Index_11 [183::169]

| pCode | PRF | SymLen | Factor | Chips | Amp |
|---|---|---|---|---|---|
| 47 | 230.50 | 0.7332 | 2 | 366 | 0.26 |
| 48 | 153.67 | 1.0998 | 3 | 549 | 0.32 |

TABLE 2.12

Index_12 [237::256]

| pCode | PRF | SymLen | Factor | Chips | Amp |
|---|---|---|---|---|---|
|  | 234.06 | 1.0938 | 2 | 546 | 0.26 |

TABLE 2.13

Index_13 [364::81]

| pCode | PRF | SymLen | Factor | Chips | Amp |
|---|---|---|---|---|---|
|  | 111.09 | 0.7292 | 1 | 364 | 0.38 |

TABLE 2.14

Index_14 [381::361]

| pCode | PRF | SymLen | Factor | Chips | Amp |
|---|---|---|---|---|---|
|  | 473.00 | 0.7632 | 1 | 381 | 0.18 |

TABLE 2.15

Index_15 [553::529]

| pCode | PRF | SymLen | Factor | Chips | Amp |
|---|---|---|---|---|---|
| 49 | 477.53 | 1.1078 | 1 | 553 | 0.18 | wherein:
  rows highlighted in gray are duplicate symbol lengths that we have allocated to a different pCode, but any of these may easily be reallocated to a different combination of Code Index and spreading factor having the same symbol length;
  in the header of each of the Tables 2, within the square brackets, we have enumerated the length first followed by the number of non-zero pulses in the respective code; and
  for convenience of reference, we have sequentially enumerated each unique symbol length with a respective pCode, which we shall refer to expressly in the appended claims.

In our First Provisional Application, we proposed exemplary codes for lengths 57 and 553. In our Second Provisional, we proposed exemplary codes for all of the 15 codewords in Table 1. Below, for convenience of reference, are the full set of 16 codewords, enumerated by the code index used in Table 1:

| Index | Code |
|---|---|
| 1 | 00+0+++- |
| 2 | +0+0++00--++- |
| 3 | --0-+00-++-0+0+-+++++ |
| 4 | ++00+00---+-0++-000+0+0-+0+0000 |
| 5 | +0+0++-++--+-0++++---+++++-+++-0-+0---+---+-+0++-+--+00-+ |
| 6 | 0000+00000000+0000-00000-0+0000+000000-00-+00000-0+00-+0+++0000 |
| 7 | 00+0+++0++-+-+-0++++--++---+---0++-+0++++---++-+----+-0++-+---+0++-++-++- |
| 8 | +0+0-+-+----0+-++-++------0+-+++-+++-+++++0+-+-+0-+-+++---++++++--+-++-++--00-++0--0++--+++- |
| 9 | +00+000-0--00--+0+0+00-+-++0+0000++-000+00-00--0-+0+0--0-+++0++000+-0+00-0++-0+++00-+00+0+0-0++-+---+000000+00000-+0000-0-000--+ |
| 10 | +00+---+++++++++-0++0+0+++0-+----+0---++-+++-++----+-+-0-+++-+-0+-+----+-+----+-++-+---+++0+---+++++0++--++--+--0++--+-+---++++-++-+--++- |
| 11 | -0--+++-+++--+-+-+--+-+++++0--++-++-+---0+0+++0+-0-----+-++--0++++-+----+++-+-+--++-++-+0-++++-+-++++-++-++++++++-+--++---+0+-----++--+++++++--++0+-+-+-+--00--+-+-++--++-+-0---++--0-++ |
| 12 | -0+0+--+++0+--+----0---++++--+----+-++-++-+-+-+00-+++-----++----++---0-+----+-0+-+--++-+-+++-+-+++-+++++++-++-+-+-+++++---+++--0+--+++-++---+++-++-+----+-+++++++--+-+0++----++++-+0-++-+0-+-0-++-+-+-+++0++--+--+------+0--+-+-+++++++++----++--+-0-+++--+-+---++++-+++--++-0+ |
| 13 | 00--000000000-000000+-000000000+000-000+0-00-00-+000000000-00-00000000+0+00000000--+0000000000000000000+0000-0---00000000000+000000+00-000+000000000000000000000+0000+000+0000000-+000000000+++00+0-0000000+--+00+00-0-0+++000000-00000+00000000--00+000-00000000--00000000+000000+00+00+000++000++--000-0+00-00000-00+00000+0-0+-0-+0+00000000+0000000+-00000-00000+00+0000000+ |

-continued

| Index | Code |
|---|---|
| 14 | +0+0-++-++-++++-++--++-+0+-++++---+-+-+0-----+--+-+--+---0---<br>+++---+-+-+-+-++++-+-+--++------+---++++0--++--++-+-+-+-+-+++-<br>+--+--0+--+++--++++-+----+--+-++++++-++-+-++-+--++-++--++-<br>++++----+--+-0--++--0--++++---++0--+++--0+++--++-+-+--0+-0--<br>++++---++-+---+-+++--+---+----++++++-++-+-+++-++-++-<br>+++0+++++-++0-+-0+++------+-++++-+-++++++-----++++--0----+--<br>++00+++0+--++--+++-++-+------+- |
| 15 | -0--++---+++--+--++---+--+--++++++----+++-++-0+++++++--+-+----<br>++-+++-++---+-++++++-+++----++-----+----0---+++++++++-+----+++-<br>++-+-++++-+-++++-++-++++++--++--++-+-0--+---++++-0+++-<br>+++---++-+-+-++-+--+---+++---0++-------+-+-+-++++--0-+-+-+-+----<br>+-+--0-+-+0-+++-++----+-++++-+---+++++-+--0-0---+--++-++0+0---<br>++---++-+-++-0--+-++0--++-+-+-++-0+-+----+-+++-++--++++-<br>++++-+++--++++++++-+---+-----+-+---+-++++---+---0--++---++--<br>++-0--+0+0+0-+----+----++++---+-+----+0-++-++-++++--+-++-+--++-<br>+++--+++++0 |

In summary, we have developed the above set of 49 unique preamble symbols, i.e., combinations of Code Index and spreading factor that generate symbols of unique length that will not mutually cross-correlate when repeated to generate a preamble sequence. In general, each of these preamble symbols has a different unique length of around 1 is duration (at the 499.2 MHz chipping frequency). As is known, this 1 s is a typical upper bound on UWB channel propagation times (the durations actually range between 729 ns and 1170 ns). We intentionally did not include shorter ones because we desired durations long enough to cover the typical UWB channel propagation times, and we did not include longer ones since more working memory is typically required to process them. However, we recognize that other choices may be appropriate in particular system configurations and applications.

Shown in FIG. 2 is a UWB communication system 14 comprising a network controller ("Control") 16 and two network devices ("N[x]") 18-20, each comprising a UWB transceiver 10 having an effective field illustrated by the respective concentric dotted circle. For simplicity, we have shown only two N, and assume that each N comprises a representative member of a unique network. For example, the several N may each comprise independent peer-to-peer networks between multiple groups of friends co-located at some venue; or, alternatively, multiple sensing and control systems within a single building complex, e.g., N[0] 18 may comprise afire monitoring system, and N[1] 20 a real time location system ("RTLS"). Another possible system could be an emergency alarm system. As will be evident to those familiar with this art, the Standard with only three preamble symbol lengths would be limited to three co-existing low-interference networks. However, in accordance with our invention, many more networks may be co-located provided that each network is assigned a unique pCode. This assignment might be done by a system administrator at install time, or might be dynamically assigned by Control 16 (or the respective controller within each network). In general, the cross-network interference should be minimal because the receivers in one network using one pCode are not triggered by the preamble sequences being employed in the other networks using different pCodes.

In § 5.5.7.8.2 of the Standard, UWB PHYs may optionally implement dynamic preamble selection ("DPS") to improve resistance to attacks by hostile nodes. However, the Standard's DPS option is limited to switching between a precoordinated set of ternary codes defined for the assigned frequency, i.e., the assigned PRF per se cannot be changed. In accordance with an embodiment of our invention, we propose that the PHYs of a network be allowed simultaneously to switch between pCodes in accordance with a precoordinated pSchedule. In general, a pSchedule comprises a predetermined sequence of our pCodes and a schedule for performing each sequential switch. Depending on the application, the schedule may be developed as a function of the number of transmissions, e.g., one per switch; or as a function of elapsed time, e.g., one second of local clock time between switches; or as a function of another, mutually agreed standard unit of work, e.g. transmit or receive. While the transmission-based approach appears to us to be the most convenient, others are certainly feasible. Further, we note that the pSchedule can itself be dynamically modified or extended by mutual agreement of the devices in a network using known network management techniques.

As is known, the Standard provides different preamble codes having the same PRF and spreading factor. The intent was to allow different networks to be co-located without interfering with each other by virtue of the different preamble codes used in their preamble training sequences. For example, there are many length 31 codes (at 16 MHz PRF) and distinct codes have <~-10 dB cross-correlation with each other. The idea was to use distinct codes for separate networks. This intention was not, however, realized. The problem is that if you accumulate the many correlations of one code with a different one, the cross-correlation of the sum is still only ~-10 dB, i.e., it doesn't reduce as you accumulate more and more symbols. This is because the successive symbols in the different sequences line up with each other because they have the same period. In contrast, we have realized that if you use distinct symbol lengths for separate networks, where the symbols are repeated N times, the successive symbols do not line up with each other since the symbol lengths are different, and in this case accumulating cross-correlations does reduce the cross-correlation. Although the Standard defines three PRFs (4 MHz, 16 MHz and 64 MHz) which have this property, these PRFs were specified for reasons other than their lower mutual interference properties, and each has a set of codes that do mutually interfere. In accordance with our invention, we submit that all of our pCodes are suitable for use in co-located networks due to their inherently different symbol lengths.

Although we have described our invention in the context of particular embodiments, one of ordinary skill in this art will readily realize that many modifications may be made in such embodiments to adapt either to specific implementations. For example, we recognize that the Tables presented above do not include all possible Ipatov sequences that may be instantiated. Further, we recognize that there may be other PRFs for each of the codes set forth in the Tables that may prove attractive in specific applications; those we have included represent what we believe to be reasonable costs in terms of hardware/software implementation.

Thus it is apparent that we have provided a method and apparatus for increasing both the number of independent UWB channels and the capacity, i.e., the number of distinguishable symbol lengths, of each. Further, we submit that our method and apparatus provides performance generally superior to the best prior art techniques.

The invention claimed is:

1. A method in an ultra-wideband ("UWB") communication and/or location system comprising co-located first and second UWB networks, the first UWB network comprising a first UWB transmitter and a first UWB receiver, the second UWB network comprising the first UWB transmitter and a second UWB receiver, the method comprising the steps of:
    [1] selecting a first and a second unique preamble code ("pCode"), each pCode comprising a combination of:
        a selected one of a plurality of predefined modulation codes; and
        a selected one of a plurality of spreading factors;
        wherein the combination results in a unique symbol length for each pCode;
    [2] assigning to each of said first and second UWB networks, respectively, the first and second pCodes;
    [3] simultaneously operating each of said first and second UWB networks, respectively, using the first and second pCodes; and
    [4] simultaneously switching each of the first and second UWB networks to a different one of the first and second unique pCodes in accordance with a precoordinated preamble schedule ("pSchedule").

2. A UWB communication system comprising a co-located first and second UWB networks, the first UWB network comprising a first UWB transmitter and a first UWB receiver, the second UWB network comprising the first UWB transmitter and a second UWB receiver, said UWB communication system being configured to perform a method comprising the steps of:
    [1] selecting a first and a second unique preamble code ("pCode"), each pCode comprising a combination of:
        a selected one of a plurality of predefined modulation codes; and
        a selected one of a plurality of spreading factors;
        wherein the combination results in a unique symbol length for each pCode;
    [2] assigning to each of said first and second UWB networks, respectively, the first and second pCodes;
    [3] simultaneously operating each of said first and second UWB networks, respectively, using the first and second pCodes; and
    [4] simultaneously switching each of the first and second UWB networks to a different one of the first and second unique pCodes in accordance with a precoordinated preamble schedule ("pSchedule").

3. A non-transitory computer readable medium including executable instructions which, when executed in a processing system, causes the processing system to perform the steps of a method according to claim 1.

* * * * *